United States Patent
Kitai et al.

(10) Patent No.: US 11,454,873 B2
(45) Date of Patent: Sep. 27, 2022

(54) POLARIZED PROJECTION SYSTEM AND METHOD

(71) Applicant: Advanced Video Technology Solutions Ltd., Dundas (CA)

(72) Inventors: Adrian Howard Kitai, Mississauga (CA); Christopher Lawrence Cavalieri, Ancaster (CA)

(73) Assignee: ADVANCED VIDEO TECHNOLOGY SOLUTIONS LTD., Dundas (CA)

( * ) Notice: Subject to any disclaimer, the term of this patent is extended or adjusted under 35 U.S.C. 154(b) by 96 days.

(21) Appl. No.: 16/934,768

(22) Filed: Jul. 21, 2020

(65) Prior Publication Data
US 2021/0026232 A1    Jan. 28, 2021

Related U.S. Application Data

(60) Provisional application No. 62/876,880, filed on Jul. 22, 2019.

(51) Int. Cl.
| | | |
|---|---|---|
| *G03B 21/20* | (2006.01) | |
| *G02B 5/30* | (2006.01) | |
| *G03B 21/604* | (2014.01) | |

(52) U.S. Cl.
CPC ....... *G03B 21/2073* (2013.01); *G02B 5/3083* (2013.01); *G03B 21/604* (2013.01)

(58) Field of Classification Search
CPC .... G03B 21/006; G03B 21/008; G03B 21/28; G03B 21/208; G03B 21/604; G03B 21/2053; G03B 21/2073; H04N 9/315; H04N 9/365; H04N 9/3105; H04N 9/3126; H04N 9/3161; G02B 5/003; G02B 5/18; G02B 5/30; G02B 5/305; G02B 5/3083
See application file for complete search history.

(56) References Cited

U.S. PATENT DOCUMENTS

| | | | |
|---|---|---|---|
| 5,760,954 A | 6/1998 | Tatsuki | |
| 6,449,089 B1* | 9/2002 | Moshrefzadeh | G03B 21/604 359/454 |
| 8,388,138 B1* | 3/2013 | Boothroyd | G03B 35/26 353/7 |
| 9,366,950 B2* | 6/2016 | Drumm | H04N 13/363 |
| 9,658,462 B1* | 5/2017 | Duffy | G03B 21/606 |
| 2005/0180296 A1* | 8/2005 | Ooto | G11B 7/1365 369/112.22 |

* cited by examiner

*Primary Examiner* — Sultan Chowdhury
(74) *Attorney, Agent, or Firm* — Hill & Schumacher (57) ABSTRACT

A projection system for use with a polarized projection screen having a screen polarization direction. The projection system includes a projector operable to generate a polarized light output and project the polarized light output along a beam path towards the polarized projection screen. The polarized light output includes at least a first light component having a first polarization direction and a second light component having a second polarization direction orthogonal to the first polarization direction. The projection system also includes a waveplate received in the beam path. The waveplate is structured to rotate at least one of the first light component and the second light component such that the first light component and the second light component have a common polarization direction to be aligned with the screen polarization direction to minimize absorption loss of the polarized light output.

18 Claims, 4 Drawing Sheets

POLARIZED PROJECTION SYSTEM AND METHOD

RELATED APPLICATIONS

This application claims the benefit of U.S. Provisional Application Ser. No. 62/876,880, filed Jul. 22, 2019, the entirety of which is hereby incorporated by reference.

FIELD

The specification relates generally to apparatus and methods associated with projection systems, and more specifically to projection systems utilizing polarized light.

BACKGROUND

Projection systems include one or more projectors and may include one or more projection screens. Projection systems may be used, for example, in movie theaters, classrooms, or meeting rooms.

A projection screen may be a front projection screen which includes a reflective layer that reflects light from the projector to a viewer. The reflective layer may be, for example, a white textured vinyl film. A projection screen may be a rear projection screen which includes a diffuse transmissive layer that transmits light from the projector to a viewer. The transmissive layer may be, for example, a textured clear plastic film. A projection screen may be a multiple layer front or rear projection screen including a series of bonded optical layers. A multiple layer screen may allow for improved control of viewing angle range and improved resistance to screen washout (i.e. an improved resistance to a reduction in the contrast of viewed images due to ambient light that reflects and/or is transmitted from the screen).

Some projection screens include a polarizer, such as a linear polarizer, to reduce washout. A linear polarizer may reduce ambient light reflection and/or transmission since ambient light is generally not polarized, and a polarized projection screen may result in optical absorption of approximately half of ambient light arriving at the polarized projection screen. U.S. Pat. No. 5,760,954 to Tatsuki et al. ("Tatsuki") purports to disclose a reflective type screen that has well-balanced properties and is capable of producing a clear image even in a lighted room. The screen has a reflective layer formed on a substrate, a polarizing film layer adhered to the reflective layer through an adhesive layer, and a light diffusion layer on the other side of the polarizing film layer.

Using a non-polarized projector with a polarized projection screen may result in projector light being absorbed. If projector light is absorbed, a more powerful projector may be required to achieve a desired image brightness, with associated increases in power consumption and/or projector cost. Accordingly, a projection system may include a polarized projector that generates polarized light. A polarized projector may be used in conjunction with a polarized projection screen, with the polarization direction of the light emitted from the polarized projector aligned with the polarization direction of the polarized projection screen.

Some polarized projectors are liquid crystal projectors that form full color images using red, green, and blue light components. Some liquid crystal projectors use a liquid crystal light modulator for each of the red, green, and blue light components to linearly polarize the corresponding light component. There are aligned polarization projectors in which all three color components of the light output from the projector have the same polarization direction. These aligned polarization projectors are generally substantially more expensive than orthogonally polarized projectors.

Orthogonally polarized projectors may combine linearly polarized red, green, and blue light components using a dichroic prism that reflects or transmits the light components. Orthogonally polarized projectors may generate green light that is linearly polarized in a first direction such that it is transmitted through the dichroic prism, and may generate red light and blue light that are each linearly polarized in a second direction that is orthogonal to the first direction such that the red light and the blue light reflect within the dichroic prism. However, since the first direction is orthogonal to the second direction, the linear polarization direction of the polarized projection screen cannot be aligned with both the first and second polarization directions of the generated red, green, and blue light.

Accordingly, there is a need for improved projection systems, such as improved projection systems using orthogonally polarized projectors.

SUMMARY

The following summary is intended to introduce the reader to various aspects of the applicant's teaching, but not to define any invention.

According to some aspects, there is provided a projection system, comprising a projector operable to generate a polarized light output and project the polarized light output along a beam path, the polarized light output including at least a first polarized light component having a first polarization direction and a second polarized light component having a second polarization direction orthogonal to the first polarization direction; a waveplate situated in the beam path, the waveplate structured to rotate at least one of the first polarized light component and the second polarized light component such that the first polarized light component and the second polarized light component have a common polarization direction; a polarized projection screen in the beam path, the polarized projection screen having a screen polarization direction; and wherein the common polarization direction is aligned with the screen polarization direction to minimize absorption loss of the polarized light output.

In some examples, the polarized light output includes a third polarized light component having the first polarization direction, and the waveplate is structured to rotate at least one of the first polarized light component, second polarized light component, and third polarized light component such that the first polarized light component, the second polarized light component, and the third polarized light component have the common polarization direction.

In some examples, the first polarized light component has a wavelength of maximum intensity between 600 nm and 650 nm, the second polarized light component has a wavelength of maximum intensity between 520 nm and 560 nm and the third polarized light component has a wavelength of maximum intensity between 440 nm and 480 nm.

In some examples, the waveplate comprises a birefringent material having a first refractive index in a first direction that is higher than a second refractive index in a second direction orthogonal to the first direction, the first and second directions being orthogonal to a propagation direction of the polarized light output along the beam path.

In some examples, the first and second refractive indices are wavelength dependent.

In some examples, the waveplate has a thickness through which the beam path extends, and wherein the thickness, the first refractive index, and the second refractive index are selected to rotate the first polarized light component n times, to rotate the second polarized light component o+½ times, and to rotate the third polarized light component p times, where n, o, and p are integers.

In some examples, the waveplate is a multiple-order waveplate.

In some examples, the waveplate is a third order waveplate.

In some examples, the projector includes a projection lens, and the waveplate is between the projection lens and the polarized projection screen.

In some examples, the common polarization direction is substantially aligned with the first polarization direction.

In some examples, the common polarization direction is substantially aligned with the second polarization direction.

In some examples, the waveplate is made of single crystal quartz.

In some examples, the polarized projection screen includes a linear polarizer layer determining the screen polarization direction, and the common polarization direction is a linear polarization direction.

In some examples, the polarized projection screen is a front projection screen.

In some examples, the polarized projection screen is a rear projection screen.

In some examples, the projector generates the first polarized light component and the second polarized light component separately and combines the first polarized light component and the second polarized light component using a prism.

According to some aspects, there is provided a projection system for use with a polarized projection screen having a screen polarization direction, the projection system comprising a projector operable to generate a polarized light output and project the polarized light output along a beam path towards the polarized projection screen, the polarized light output including at least a first light component having a first polarization direction and a second light component having a second polarization direction orthogonal to the first polarization direction; and a waveplate situated in the beam path, the waveplate structured to rotate at least one of the first light component and the second light component such that the first light component and the second light component have a common polarization direction to be aligned with the screen polarization direction to minimize absorption loss of the polarized light output.

In some examples, the waveplate comprises a birefringent material having a first refractive index in a first direction that is higher than a second refractive index in a second direction orthogonal to the first direction, the first and second directions being orthogonal to a propagation direction of the polarized light output along the beam path.

According to some aspects, there is provided a method of increasing a color gamut of an image of a projection system generating a polarized light output including a first polarized light component having a first wavelength and a first polarization direction and a second polarized light component having a second wavelength and a second polarization direction orthogonal to the first linear polarization direction; and projecting the polarized light output along a beam path through a waveplate and towards a polarized projection screen having a linear screen polarization direction, the waveplate structured to rotate at least one of the first polarized light component and the second polarized light component such that the first polarized light component and the second polarized light component have a common linear polarization direction aligned with the linear screen polarization direction to minimize absorption loss of the polarized light output, and wherein the waveplate is structured to elliptically polarize a further polarized light component having a further wavelength that is between the first wavelength and the second wavelength.

In some examples, the waveplate has a thickness through which the beam path extends and comprises a birefringent material having a first refractive index in a first direction that is higher than a second refractive index in a second direction orthogonal to the first direction, the first and second directions being orthogonal to a propagation direction of the polarized light output along the beam path, and wherein the thickness, the first refractive index, and the second refractive index are selected to rotate the first polarized light component n times, to rotate the second polarized light component n+½ times, and to cause the further polarized light component to be elliptically polarized, where n is an integer.

In some examples, the first polarized light component is red light and the second polarized light component is green light and the further polarized light component is yellow light.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses or process described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim, or dedicate to the public any such invention by its disclosure in this document.

Figure 1:
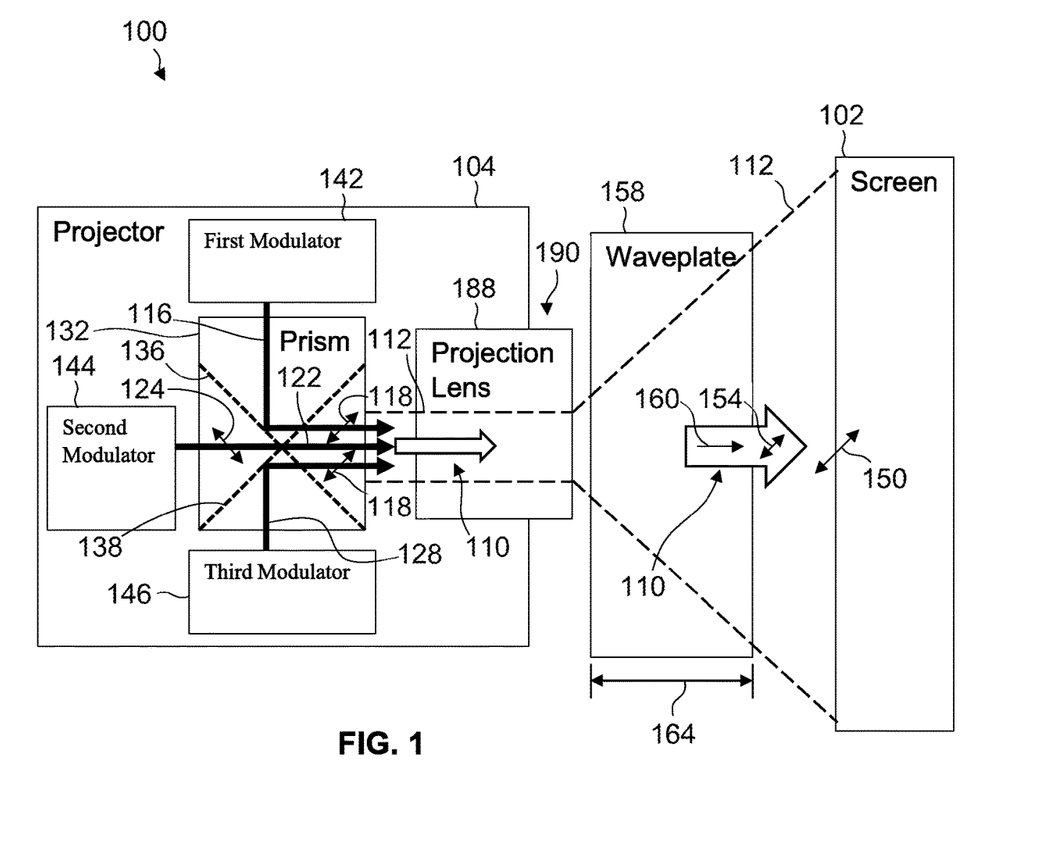
FIG. 1 is a schematic diagram of a projection system.

Referring to FIG. 1, an example of a projection system 100 is illustrated. The projection system 100 may be for use with, and/or may optionally include, a polarized projection screen 102. The polarized projection screen 102 may be a front projection screen (i.e. the viewer is meant to be located so as to view the side of the screen receiving the light form the projector) or a rear projection screen (i.e. the viewer is meant to be located so as to view the side of the screen directly opposite the side receiving the light from the projector).

The projection system 100 includes a projector 104 operable to generate a polarized light output 110 and project the polarized light output 110 along a beam path 112. The projector 104 may be an liquid crystal projector that produces an output having light components with two orthogonal polarization directions (e.g. horizontally polarized green light, vertically polarized red light, and vertically polarized blue light, as discussed further below).

The polarized light output 110 includes a plurality of desired polarized light components to make up a projection image desired by a user. At least one of the plurality of desired polarized light components of the polarized light output 110 of the projector 104 has a polarization direction orthogonal to at least one other of the plurality of desired polarized light components. Using a projector which generates an output with at least one polarized light component having a polarization direction orthogonal to at least one other polarized light component may be desirable over using an alternative projector (e.g. for cost reasons).

As in the illustrated example, the polarized light output 110 may include at least a first polarized light component 116 having a first polarization direction 118 and a second polarized light component 122 having a second polarization direction 124 orthogonal to the first polarization direction. In some examples, the polarized light output 110 includes a third polarized light component 128 having the first polarization direction 118. For example, the first polarized light component 116 may be red light, the second polarized light component 122 may be green light, and the third polarized light component 128 may be blue light.

The first polarized light component 116 may have a wavelength of maximum intensity of about 620 nm, such as between 600 nm and 650 nm, between 615 nm and 625 nm, or between 618 nm and 622 nm. The second polarized light component 122 may have a wavelength of maximum intensity of about 530 nm, such as between 520 nm and 560 nm, between 525 nm and 535 nm, or between 528 nm and 532 nm. The third polarized light component 128 may have a wavelength of maximum intensity of about 470 nm, such as between 440 nm and 480 nm, between 465 nm and 475 nm, or between 468 nm and 472 nm.

As in the illustrated example, the projector 104 may generate the first polarized light component 116, the second polarized light component 122, and the third polarized light component 128 separately. The projector 104 may combine the first polarized light component 116, the second polarized light component 122, and the third polarized light component 128 using a prism 132. For example, the projector 104 may use a dichroic prism having a first internal surface 136 for reflecting the first polarized light component 116 and a second surface 138 for reflecting the third polarized light component 122, with the second polarized light component 128 passing through the prism 132 without substantial reflection. Accordingly, in some examples, the projector generates three light components and combines the three light components to generate the polarized light output 110. The projector 104 may be an orthogonally polarized liquid crystal projector employing a first liquid crystal light modulator 142 for use in polarizing the first light component 116, a second liquid crystal light modulator 144 for use in polarizing the second light component 122, and a third liquid crystal light modulator 146 for use in polarizing the third light component 128.

The beam path 112 may be directed towards the polarized projection screen 102. The polarized projection screen 102 may be in the beam path 112 and may have a screen polarization direction 150. As the first polarization direction 118 and the second polarization direction 124 are orthogonal, the screen polarization direction 150 may be aligned with one of the first polarization direction 118 and the second polarization direction 124 to efficiently transmit or reflect light components having that polarization direction. However, the screen polarization direction 150 may result in light components which have the other of the first polarization direction 118 and the second polarization direction 124 being substantially absorbed by the polarized projection screen 102. Rotating at least one of the light components such that the desired light components have a common polarization direction 154 may allow the polarized light output 110 to be efficiently provided to the viewer of the polarized projection screen.

To rotate at least one of the desired light components the projection system 100 also includes a waveplate 158 received in the beam path 112. In some examples, the waveplate 158 is structured to selectively align the polarization orientation of light output from the projector 104 to facilitate use of the projector 104 with the polarized projection screen 102. The waveplate 158 is structured to rotate at least one of the plurality of desired polarized light components such that the plurality of desired polarized light components have the common polarization direction 154.

The common polarization direction 154 can be aligned with the screen polarization direction to minimize absorption loss of the polarized light output. Optionally, the polarized projection screen 102 is linearly polarized, and the common polarization direction 154 is a linear or plane polarization direction. For example, the polarized projection screen 102 may include a linear polarizer or a linear polarizer layer determining the screen polarization direction 150. The linear polarizer or linear polarizer layer may be aligned with the polarized light output 110 such that the polarized projection screen 102 may efficiently reflect (e.g. a front-projection screen) or transmit (e.g. a rear-projection screen) the polarized light output 110.

For example, the waveplate 158 may be structured to rotate at least one of the first polarized light component 116 and the second polarized light component 122 such that the first light component and the second light component have the common polarization direction 154. The common polarization direction 154 can be aligned with the screen polarization direction 150 to minimize absorption loss of the polarized light output 110 (i.e. so that the polarized projection screen 102 may efficiently reflect or transmit the polarized light output 110). The common polarization direction 154 may be substantially aligned with the first polarization direction 118, as in the illustrated example (e.g. to facilitate use of the projector in a portrait mode). The common polarization direction 154 may alternatively be substantially aligned with the second polarization direction 124 (e.g. to facilitate use of the projector in a landscape mode in which the projector is rotated by 90 degrees from the portrait mode).

If the polarized light output 110 includes the third polarized light component 128, the waveplate 158 is structured to rotate at least one of the first polarized light component 116, the second polarized light component 122, and the third polarized light component 128 such that each of the first polarized light component 116, the second polarized light component 122, and the third polarized light component 128 have the common polarization direction 154.

The waveplate 158 may be and/or include a birefringent material having a first refractive index in a first direction that is higher than a second refractive index in a second direction orthogonal to the first direction, the first and second directions being orthogonal to a propagation direction 160 of the polarized light output 110 along the beam path 112. The first and second refractive indices may be wavelength dependent. The waveplate 158 may be made of a non-isotropic material that exhibits wavelength-dependent birefringence. The waveplate 158 may be made of single crystal quartz, such as single crystal quartz suitably cut and oriented with respect to the light source. The waveplate 158 may be a multiple-order waveplate causing more than one full rotation of polarized light.

As in the illustrated example, the waveplate 158 may have a thickness 164 through which the beam path 112 extends. The thickness 164, the first refractive index, and the second refractive index may be selected to rotate the first polarized light component 116 n times, to rotate the second polarized light component 122 o+½ times, and to rotate the third polarized light component 128 p times, where n, o, and p are integers. Accordingly, the second polarized light component 122 may exit the waveplate 158 with a polarization direction orthogonal to the direction it had when it entered the waveplate 158. In some examples, n and o are equal, and p=n+1.

Figure 2:
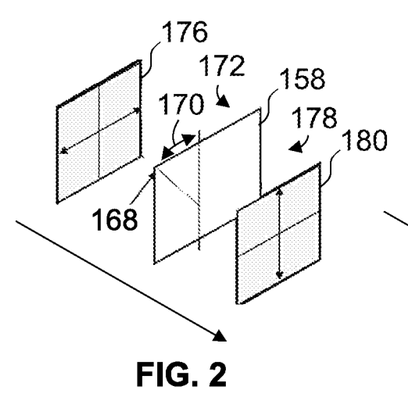
FIG. 2 is a schematic diagram of green light passing through a first example waveplate.
Figure 3:
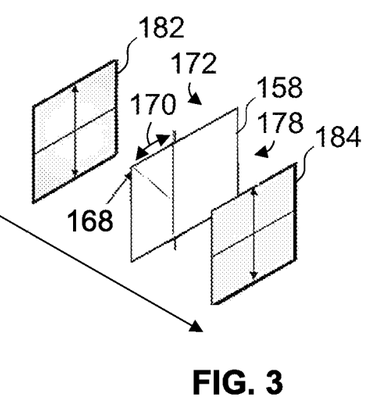
FIG. 3 is a schematic diagram of red and blue light passing through the first waveplate of FIG. 2.

Referring now to FIGS. 2 and 3, in a specific example the waveplate 158 may be a third order waveplate with a fast axis 168 at an angle 170 of 45 degrees from vertical. Red, green, and blue light may be generated by an orthogonally polarized liquid crystal projector employing three liquid crystal modulators. Green light with a wavelength of 531 nm enters a first end 172 of the waveplate 158 as horizontally linearly polarized light 176, and exits an opposite second end 178 of the waveplate 158 as vertically linearly polarized light 180. Red light with a wavelength of 612 nm and blue light with a wavelength of 471 nm each enter the first end 172 of the waveplate 158 as vertically linearly polarized light 182, and exit the second end 178 as vertically linearly polarized light 184.

Figure 4:
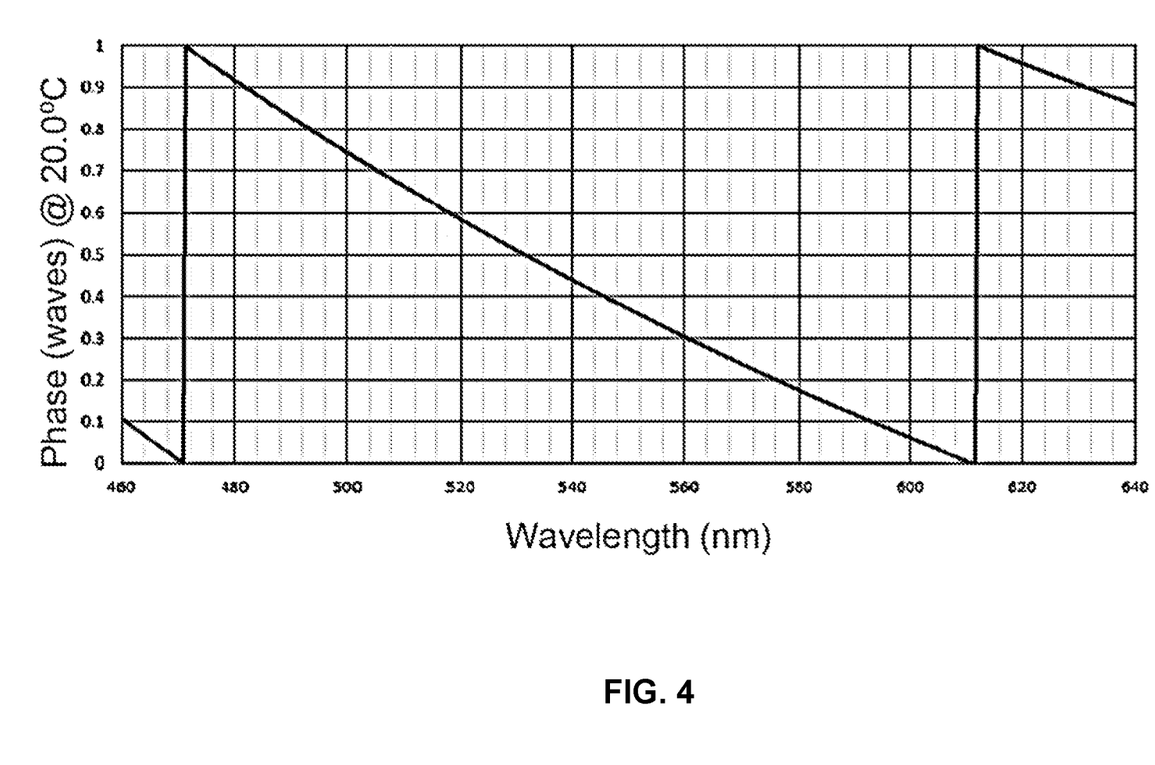
FIG. 4 is a graph of the relative phase of light as a function of wavelength for light passing through a second example waveplate.

Referring now to FIG. 4, illustrated is a graph showing the wavelength dependence of the phase of light waves passing through an example waveplate 158. The example waveplate 158 used in generating the graph of FIG. 4 is a third order quartz waveplate designated QWPL-532-xx-2 and available from Optisource LLC of Albuquerque, N. Mex.

In some examples, an important aspect of the image quality of the projection system 100 is the projection system's color gamut. The color gamut is the range of colors that may be represented by the projection system 100, and the color gamut may be optimized by using highly saturated color components of light.

For example, green light having a single wavelength at or near 530 nm may be a highly saturated green light component. The projector 104 may produce the green component of the polarized light output 110 from a range of wavelengths within the blue-green, green and green-yellow spectral ranges from approximately 500 nm to 580 nm, as do many practical lamp-based or LED-based projectors. To increase the saturation of the green component, light with wavelengths that substantially deviate from a highly saturated green wavelength (e.g. the blue-green light in the smaller wavelength range between approximately 500 nm and 530 nm and the yellow light in the longer wavelength range between approximately 530 nm and 580 nm) may be suppressed in intensity to allow a higher proportion of true green light to constitute the green component of the polarized light output 110 that is reflected and/or transmitted by a screen. The color gamut of the projection system 100 may also or alternatively be improved if the red and/or blue components of the polarized light output 110 that are reflected and/or transmitted by a screen are similarly adjusted to increase the saturation. For example, if the saturation of the red component and/or the blue component is increased by increasing the proportion at or near 620 nm and/or 470 nm, respectively, by suppressing wavelengths that substantially deviate therefrom.

In some examples, the waveplate 158 may facilitate suppressing the brightness of light that is not substantially saturated red, saturated blue, or saturated green in color. The waveplate 158 may thus attenuate light of wavelengths that limit the color gamut of the projection system 100. For example, since the rotation of polarized light due to a waveplate may be determined by the phase change of the light, polarized light that is neither red nor green nor blue may experience the example waveplate 158 used in generating the graph of FIG. 4 as a quarter waveplate. For example, yellow light with a wavelength of 568 nm may be circularly polarized, and so half of the yellow light intensity may be absorbed by the polarized projection screen 102. Accordingly, the screen brightness of the yellow light seen by a viewer may be reduced by a factor or two. Light with a wavelength of 499 nm may be similarly affected.

An attenuation of light may also occur for other wavelengths that deviate from substantially saturated red, saturated blue, or saturated green in color. The degree of attenuation may decrease for light with wavelengths approaching those substantially saturated red, saturated blue, or saturated green in color. Polarized light emerging from the waveplate 158 may be linearly polarized only at the wavelengths selected, such as at 471 nm, 531 nm, and 632 nm for the example waveplate 158 used in generating the graph of FIG. 4.

As wavelength deviates from the wavelengths at which it emerges linearly polarized, the light may emerge from the waveplate 158 elliptically polarized. When elliptically polarized light reaches the linearly polarized projection screen, the amount reflected and/or transmitted is reduced as compared to linearly polarized light aligned with the polarization direction of the screen.

Referring again to FIG. 1, the projector 104 includes a projection lens 188, and the projection lens 188 may be part of a projection lens assembly or unit 190. The waveplate 158 may be received anywhere in the beam path. In some examples, as in the illustrated example, the waveplate 158 may be between the projection lens 188 and the polarized projection screen 102. The waveplate 158 may be at a waveplate location which is at or near the light output location of the projector 104. In some examples, the waveplate 158 is located within the projector 104, such as between the prism 132 and the projection lens 188. In some examples, the waveplate 158 is located within the projection lens assembly or unit 190 of the projector 104.

Optionally, additional optical elements could be added to further improve the projection system 100. For example, one or more additional waveplates could be situated in the beam path 112.

For example, a first quarter waveplate could be inserted into the beam path 112, such as either just after the prism 132 or elsewhere in the beam path 112. A corresponding second quarter waveplate could be situated elsewhere in the beam path 112, such as at the polarized projection screen such that light arriving at the polarized projection screen 102 passes through the second quarter waveplate before reaching the linear polarizer of the polarized projection screen 102. For example, the second quarter waveplate may correspond to the first quarter waveplate in that the waveplates are oriented relative to each other such that linearly polarized light arriving at the first quarter waveplate would emerge from the second quarter waveplate having substantially linear polarization. In some examples, the thickness of the waveplate 158 is increased or decreased to change the optical retardation by a quarter wave instead of including the first quarter waveplate. Accordingly, the projector 104 could be physically rotated to any angle relative to the polarized projection screen 102, and the display system would still function.

In some examples, a waveplate, such as the waveplate 158, is secured to the projector 104 and/or incorporated into the projector 104. In some examples, a waveplate, such as the waveplate 158, is positioned in front of the projector 104, such as mounted on a movable stand in front of the projector 104.

Figure 5:
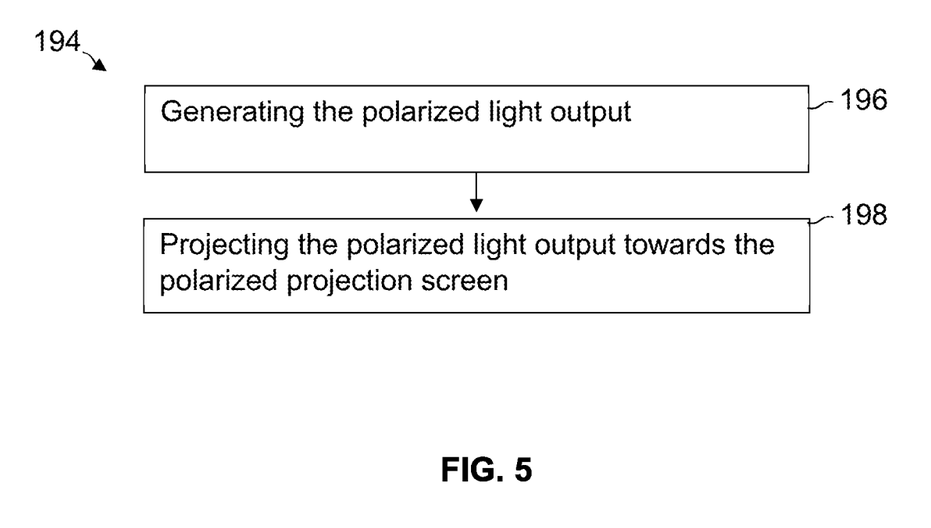
FIG. 5 is a flow chart of a method of increasing a color gamut and/or contrast ratio of an image generated by the projection system.

Referring now to FIG. 5, illustrated is a method 194 of increasing a color gamut and/or contrast ratio of an image generated by the projection system 100. The method 194 includes, at a first step 196, generating the polarized light output 110 including the first polarized light component 116 and the second polarized light component 122. The first polarized light component 116 and the second polarized light component 122 used in the method 194 have a first wavelength and a second wavelength, respectively.

The method 194 also includes, at a second step 198, projecting the polarized light output 110 along the beam path 112 through the waveplate 158 and towards the polarized projection screen 102. The polarized projection screen 102 used for the method has a linear screen polarization direction 150. The waveplate 158 used for the method 194 is structured to rotate at least one of the first polarized light component 116 and the second polarized light component 122 such that the first polarized light component 116 and the second polarized light component 122 have a common linear polarization direction 154. The common linear polarization direction 154 is aligned with the linear screen polarization direction 150 to minimize absorption loss of the polarized light output 110. The waveplate 158 used in the method is also structured to elliptically polarize a further polarized light component having a further wavelength that is between the first wavelength and the second wavelength.

The thickness 164, the first refractive index, and the second refractive index of the waveplate 158 used for the method 194 may be selected to rotate the first polarized light component 116 n times, to rotate the second polarized light component 122 n+½ times, and to cause the further polarized light component (e.g. yellow light) to be elliptically polarized (e.g. to rotate n+¼ times), where n is an integer.

The invention claimed is:

1. A projection system, comprising:
a projector operable to generate a polarized light output and project the polarized light output along a beam path, the polarized light output including at least a first polarized light component having a first polarization direction, a second polarized light component having a second polarization direction orthogonal to the first polarization direction, and a third polarized light component having the first polarization direction;
a waveplate received in the beam path, and the waveplate is structured to rotate at least one of the first polarized light component, second polarized light component, and third polarized light component such that the first polarized light component, the second polarized light component, and the third polarized light component have the common polarization direction;
a polarized projection screen in the beam path, the polarized projection screen having a screen polarization direction; and
wherein the common polarization direction is aligned with the screen polarization direction to minimize absorption loss of the polarized light output.

2. The projection system of claim 1, wherein the first polarized light component has a wavelength of maximum intensity between 600 nm and 650 nm, the second polarized light component has a wavelength of maximum intensity between 520 nm and 560 nm and the third polarized light component has a wavelength of maximum intensity between 440 nm and 480 nm.

3. The projection system of claim 2, wherein the waveplate comprises a birefringent material having a first refractive index in a first direction that is higher than a second refractive index in a second direction orthogonal to the first direction, the first and second directions being orthogonal to a propagation direction of the polarized light output along the beam path.

4. The projection system of claim 3, wherein the first and second refractive indices are wavelength dependent.

5. The projection system of claim 3, wherein the waveplate has a thickness through which the beam path extends, and wherein the thickness, the first refractive index, and the second refractive index are selected to rotate the first polarized light component n times, to rotate the second polarized light component o+'/2 times, and to rotate the third polarized light component p times, where n, o, and p are integers.

6. The projection system of claim 1, wherein the waveplate is a multiple-order waveplate.

7. The projection system of claim 6, wherein the waveplate is a third order waveplate.

8. The projection system of claim 1, wherein the projector includes a projection lens, and the waveplate is between the projection lens and the polarized projection screen.

9. The projection system of claim 1, wherein the common polarization direction is substantially aligned with the first polarization direction.

10. The projection system of claim 1, wherein the common polarization direction is substantially aligned with the second polarization direction.

11. The projection system of claim 1, wherein the waveplate is made of single crystal quartz.

12. The projection system of claim 1, wherein the polarized projection screen includes a linear polarizer layer determining the screen polarization direction, and the common polarization direction is a linear polarization direction.

13. The projection system of claim 1, wherein the polarized projection screen includes a linear polarizer layer determining the screen polarization direction, the projection system further comprising at least one additional waveplate situated in the beam path, the at least one additional waveplate including a quarter waveplate adjacent the polarized projection screen.

14. The projection system of claim 1, wherein the polarized projection screen is either a rear projection screen or a front projection screen.

15. The projection system of claim 1, wherein the projector generates the first polarized light component and the second polarized light component separately and combines the first polarized light component and the second polarized light component using a prism.

16. A projection system for use with a polarized projection screen having a screen polarization direction, the projection system comprising:
- a projector operable to generate a polarized light output and project the polarized light output along a beam path towards the polarized projection screen, the polarized light output including at least a first light component having a first polarization direction and a second light component having a second polarization direction orthogonal to the first polarization direction; and
- a waveplate situated in the beam path, the waveplate structured to rotate at least one of the first light component and the second light component such that the first light component and the second light component have a common polarization direction to be aligned with the screen polarization direction to minimize absorption loss of the polarized light output; and
- wherein the waveplate comprises a birefringent material having a first refractive index in a first direction that is higher than a second refractive index in a second direction orthogonal to the first direction, the first and second directions being orthogonal to a propagation direction of the polarized light output along the beam path.

17. A method of increasing a color gamut of an image of a projection system:
- generating a polarized light output including a first polarized light component having a first wavelength and a first polarization direction and a second polarized light component having a second wavelength and a second polarization direction orthogonal to the first linear polarization direction; and
- projecting the polarized light output along a beam path through a waveplate and towards a polarized projection screen having a linear screen polarization direction, the waveplate structured to rotate at least one of the first polarized light component and the second polarized light component such that the first polarized light component and the second polarized light component have a common linear polarization direction aligned with the linear screen polarization direction to minimize absorption loss of the polarized light output, and
- wherein the waveplate is structured to elliptically polarize a further polarized light component having a further wavelength that is between the first wavelength and the second wavelength.

18. The method of claim 17, wherein the waveplate has a thickness through which the beam path extends and comprises a birefringent material having a first refractive index in a first direction that is higher than a second refractive index in a second direction orthogonal to the first direction, the first and second directions being orthogonal to a propagation direction of the polarized light output along the beam path, and wherein the thickness, the first refractive index, and the second refractive index are selected to rotate the first polarized light component n times, to rotate the second polarized light component $n+\frac{1}{2}$ times, and to cause the further polarized light component to be elliptically polarized, where n is an integer.

* * * * *